United States Patent
Yoo et al.

(10) Patent No.: US 7,734,060 B2
(45) Date of Patent: Jun. 8, 2010

(54) METHOD AND APPARATUS FOR ESTIMATING NOISE DETERMINATION CRITERIA IN AN IMAGE SENSOR

(75) Inventors: Young-jin Yoo, Yongin-si (KR); Seong-deok Lee, Yongin-si (KR)

(73) Assignee: Samsung Electronics Co., Ltd., Suwon-si (FR)

( * ) Notice: Subject to any disclaimer, the term of this patent is extended or adjusted under 35 U.S.C. 154(b) by 839 days.

(21) Appl. No.: 11/641,865

(22) Filed: Dec. 20, 2006

(65) Prior Publication Data
US 2007/0211935 A1 Sep. 13, 2007

(30) Foreign Application Priority Data
Mar. 8, 2006 (KR) ...................... 10-2006-0021911

(51) Int. Cl.
*G06K 9/00* (2006.01)
*H04N 5/228* (2006.01)

(52) U.S. Cl. ..................... 382/100; 382/162; 348/222.1; 348/234; 348/272

(58) Field of Classification Search ................. 382/100, 382/162–172; 348/222.1–230.1, 234–243, 348/272, 294, 349–350, 497–498, 533–535, 348/606–607
See application file for complete search history.

(56) References Cited

U.S. PATENT DOCUMENTS

| | | | |
|---|---|---|---|
| 3,904,818 A * | 9/1975 | Kovac | 348/243 |
| 4,145,721 A * | 3/1979 | Beaudouin et al. | 358/463 |
| 4,305,091 A * | 12/1981 | Cooper | 348/619 |
| 4,380,755 A * | 4/1983 | Endlicher et al. | 382/324 |
| 4,392,157 A * | 7/1983 | Garcia et al. | 348/243 |
| 4,511,804 A * | 4/1985 | Ozawa | 358/463 |
| 4,518,863 A * | 5/1985 | Fukuoka et al. | 348/241 |
| 4,914,519 A * | 4/1990 | Hashimoto et al. | 348/241 |
| 5,289,286 A * | 2/1994 | Nakamura et al. | 348/223.1 |
| 5,657,401 A * | 8/1997 | De Haan et al. | 382/275 |
| 5,771,070 A * | 6/1998 | Ohzu et al. | 348/241 |
| 5,848,181 A * | 12/1998 | Ogata | 382/169 |
| 5,974,192 A * | 10/1999 | Kundu | 382/260 |
| 6,229,578 B1 * | 5/2001 | Acharya et al. | 348/607 |
| 6,535,254 B1 * | 3/2003 | Olsson et al. | 348/607 |
| 6,625,325 B2 * | 9/2003 | Gindele et al. | 382/260 |
| 6,795,586 B1 * | 9/2004 | Gindele et al. | 382/260 |
| 7,053,935 B2 * | 5/2006 | Guimaraes et al. | 348/222.1 |

(Continued)

FOREIGN PATENT DOCUMENTS

EP    1 551 173 A1    8/2003

(Continued)

*Primary Examiner*—Manav Seth
(74) *Attorney, Agent, or Firm*—Sughrue Mion, PLLC

(57) ABSTRACT

A method and an apparatus are provided for estimating noise determination criteria in an image sensor. The method includes calculating a color characteristic value for each of a plurality blocks constituting an input image, comparing the color characteristic value of a first block among the blocks with a initial noise criterion, sorting the color characteristic value of the first block as a first group of a color characteristic class and accumulating a result of the comparing into the first group, and modifying the initial noise criterion using a result of the accumulating and calculating a first group noise criterion to be applied to corresponding blocks belonging to the sorted first group of the color characteristic class.

18 Claims, 8 Drawing Sheets

U.S. PATENT DOCUMENTS

| | | | |
|---|---|---|---|
| 7,072,511 B2 * | 7/2006 | Tan et al. | 382/167 |
| 7,551,799 B2 * | 6/2009 | Rai et al. | 382/275 |
| 7,595,825 B2 * | 9/2009 | Tsuruoka | 348/241 |
| 2002/0126892 A1 * | 9/2002 | Gindele et al. | 382/166 |
| 2002/0126910 A1 * | 9/2002 | Gindele et al. | 382/254 |
| 2002/0126911 A1 * | 9/2002 | Gindele et al. | 382/254 |
| 2003/0095717 A1 * | 5/2003 | Gindele et al. | 382/260 |
| 2004/0109068 A1 * | 6/2004 | Mitsunaga et al. | 348/222.1 |
| 2006/0257046 A1 * | 11/2006 | Rai et al. | 382/275 |

FOREIGN PATENT DOCUMENTS

| | | |
|---|---|---|
| JP | 2000-354179 A | 12/2000 |
| KR | 10-2002-0000547 A | 1/2002 |

\* cited by examiner $$S_r = S_r \times G_{fluctuation}(f_r)$$

METHOD AND APPARATUS FOR ESTIMATING NOISE DETERMINATION CRITERIA IN AN IMAGE SENSOR

CROSS-REFERENCE TO RELATED APPLICATION

This application is based on and claims priority from Korean Patent Application No. 10-2006-0021911, filed on Mar. 8, 2006 the disclosure of which is incorporated herein in its entirety by reference.

BACKGROUND OF THE INVENTION

1. Field of the Invention

Apparatuses and methods consistent with the present invention relate to noise reduction in an image sensor, and more particularly, to estimating noise determination criteria in an image sensor.

2. Description of the Related Art

As well known in the related art, an image sensor is a device for reproducing an image based on photo-reactive properties of a semiconductor. Such an image sensor is constructed of small photodiodes (e.g., pixels), and processes information on light to which the photodiodes respond.

Such a pixel detects the brightness and wavelength of light emerging from each object, reads them in electric values, and converts them into a level that can be signal-processed. That is, the image sensor is a semiconductor device which converts an optical image into electric signals, and various portable electronics such as a digital camera and mobile communication terminal equipped with such an image sensor have been developed and distributed in the market.

When an image sensor takes a picture image of an object, the image has noise. However, it is difficult to remove or reduce such noise by applying noise determination criteria indiscriminately since noise or elements that may be discerned as noise are variable according to images. Noise determination criteria applied indiscriminately may determine and remove texture information erroneously as noise. Likewise, noise may be determined as texture information, and thus an image with the noise may be used. Accordingly, there is required a noise estimation method that can variably determine noise according to images.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for effectively reducing image sensor noise that would otherwise degrade image quality.

The present invention also provides a method and apparatus to generate noise which determination criteria for variably determining noise according to image characteristics and to remove such noise according to the noise determination criteria.

In accordance with an aspect of the present invention, there is provided a method for estimating noise determination criteria in an image sensor, the method including: calculating a color characteristic value for each of blocks constituting an input image; comparing the color characteristic value of a first block among the blocks with a preset initial noise criterion; sorting the color characteristic value of the first block as a first group of a predetermined color characteristic class and accumulating a result of comparison into the first group; and modifying the initial noise criterion using a result of accumulation and calculating a first group noise criterion to be applied to corresponding blocks belonging to the sorted first group of the color characteristic class.

In accordance with another aspect of the present invention, there is provided an image device including: a block characteristics calculator which calculates a color characteristic value for each of blocks constituting an input image; a sorted information accumulator which compares the color characteristic value of a first block among the blocks with a preset initial noise criterion, sorts the color characteristic value of the first block as a first group of a predetermined color characteristic class, and accumulates a result of comparison into the first group; and a noise criterion modifier which modifies the initial noise criterion using the accumulated result and calculates a first group noise criterion to be applied to corresponding blocks belonging to the sorted first group of the color characteristic class.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

The above and other aspects of the present invention will be more apparent from exemplary embodiments of the invention in conjunction with the accompanying drawings. The invention may, however, be embodied in many different forms and should not be construed to be limited to the exemplary embodiments as described hereunder. These exemplary embodiments are provided so that this disclosure will be thorough and complete, and will fully convey the scope of the invention to those skilled in the art. This invention shall be defined by the appended claims only. Throughout the specification, the same reference signs are used to designate the same or similar components.

The present invention will be described hereinafter with reference to block diagram or flowchart illustrations of the method and apparatus for estimating noise determination criteria according to exemplary embodiments of the invention. It will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks might occur out of order. For example, two blocks shown in succession may in fact be executed substantially concurrently or the blocks may sometimes be executed in the reverse order, depending upon the functionality involved.

Figure 1:
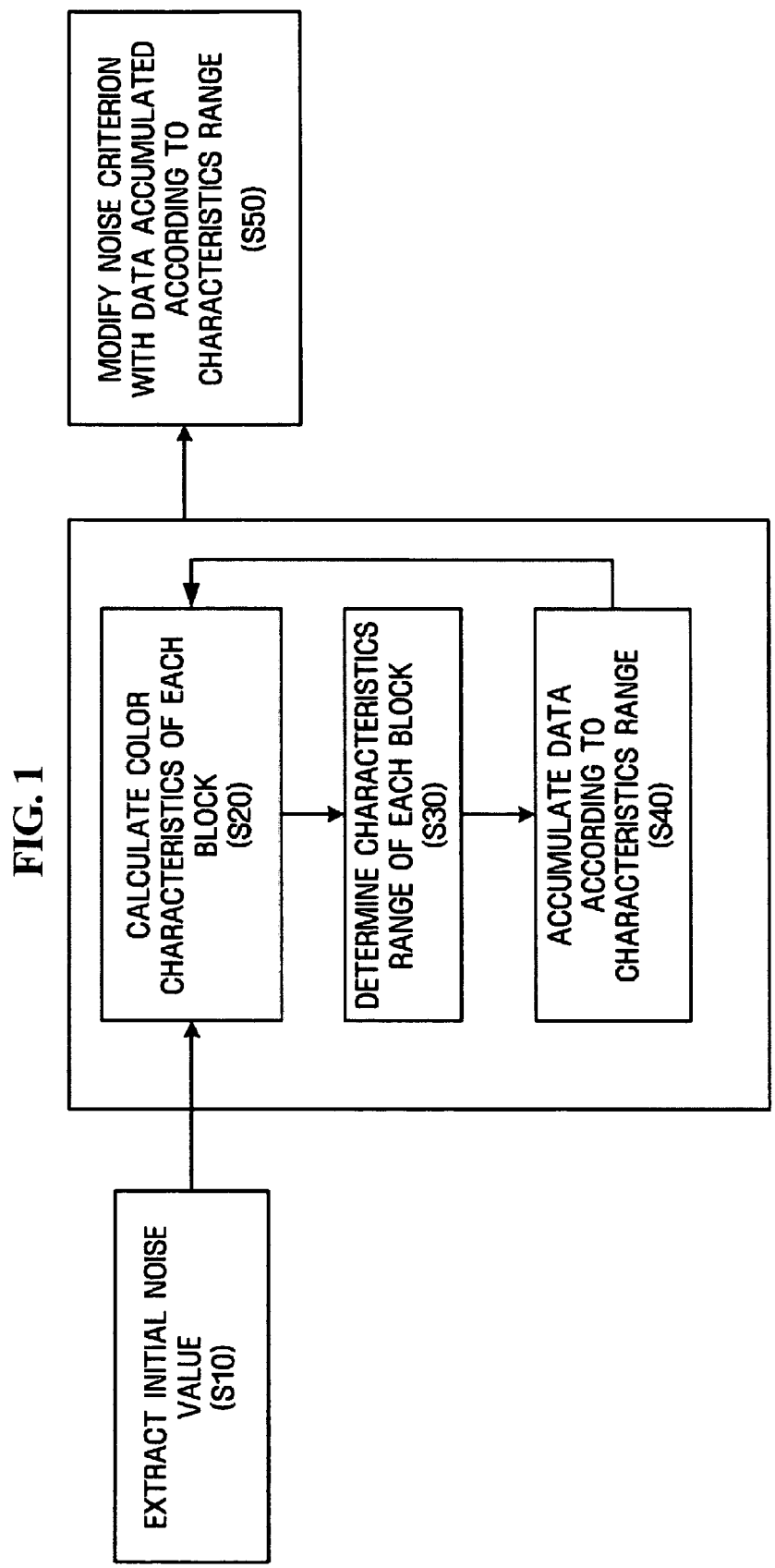
FIG. 1 is a process diagram illustrating a noise estimation process on an input image signal according to an exemplary embodiment of the invention.

FIG. 1 is a process diagram illustrating a noise estimation process on an input image signal according to an exemplary embodiment of the invention. When an image is inputted, an initial noise criterion or determination criteria is extracted in operation S10. In order to discern noise, the initial criterion is a criterion to be compared with color characteristics of pixels or blocks of the image, and modified according to characteristics of the input image.

Then, the input image is divided into blocks of a predetermined size, and the color characteristics of each block are calculated in operation S20. Such color characteristics may be of various types, which are classified according to color models. The models may be classified according to for example device-dependency and device-independency. The device-dependent models include RGB (Red, Green, Blue) model adopting a complementary color space and CMYK color model adopting a subtractive color space. The device-independent models include CIE L*a*b* model, CIE XYZ model, CIE LUV model and the like. In addition, representative models for expressing a luma-chroma color space include YCbCr model, YUV model, YIQ model and the like. Such models are well known in the related art and therefore will not be described in detail.

The above operation S20 of calculating the color characteristics means that the color characteristics of each block are calculated according to the color model. The color characteristics may be a value calculated from the color model or a value obtained by processing the former. Where the block is composed of several pixels, it is possible to select average value, dispersion value, variance value, intermediate value, representative value and the like from the color models of pixels of the block.

In operation S30, each color characteristic value calculated according to each block is compared with an initial noise criterion, and if discerned as noise, is sorted precisely in order to determine the range of the color characteristics of each block. For example, brightness can be calculated according to each block to determine the range of such brightness. This makes it possible to apply different noise criteria in the case of discerning noise from an image that covers several ranges.

In operation S40, a result calculated from between the value of the block and the noise is accumulated according to the group of the determined range of the color characteristics of the block. If the color characteristics of the block have a statistical value A, the value of the block is obtained by calculating the difference between the initial noise criterion for discerning noise and the statistical value. If the difference were a great value as a result of such calculation, the block would more likely be texture information than noise. If the difference is accumulated to the group to which the statistical value A belongs, it is possible to modify or set differently the noise criterion necessary for determining if blocks of the same group are noise.

The accumulation is used to distinguish the texture information from noise, and can be performed by calculating any difference of color characteristics between a previous block and the present one. By applying a process of operations S20, S30 and S40 to blocks of an image, it is possible to accumulate data according to characteristics group. The data according to characteristics group may be, for example, a statistical value of each block or a variance data between statistical values according to blocks. Such statistical values according to blocks can be calculated from color information of pixels composing a block.

The noise criterion is modified or changed using such accumulated data. The modified noise criterion serves as a basis for discerning noise from a texture.

Figure 2:
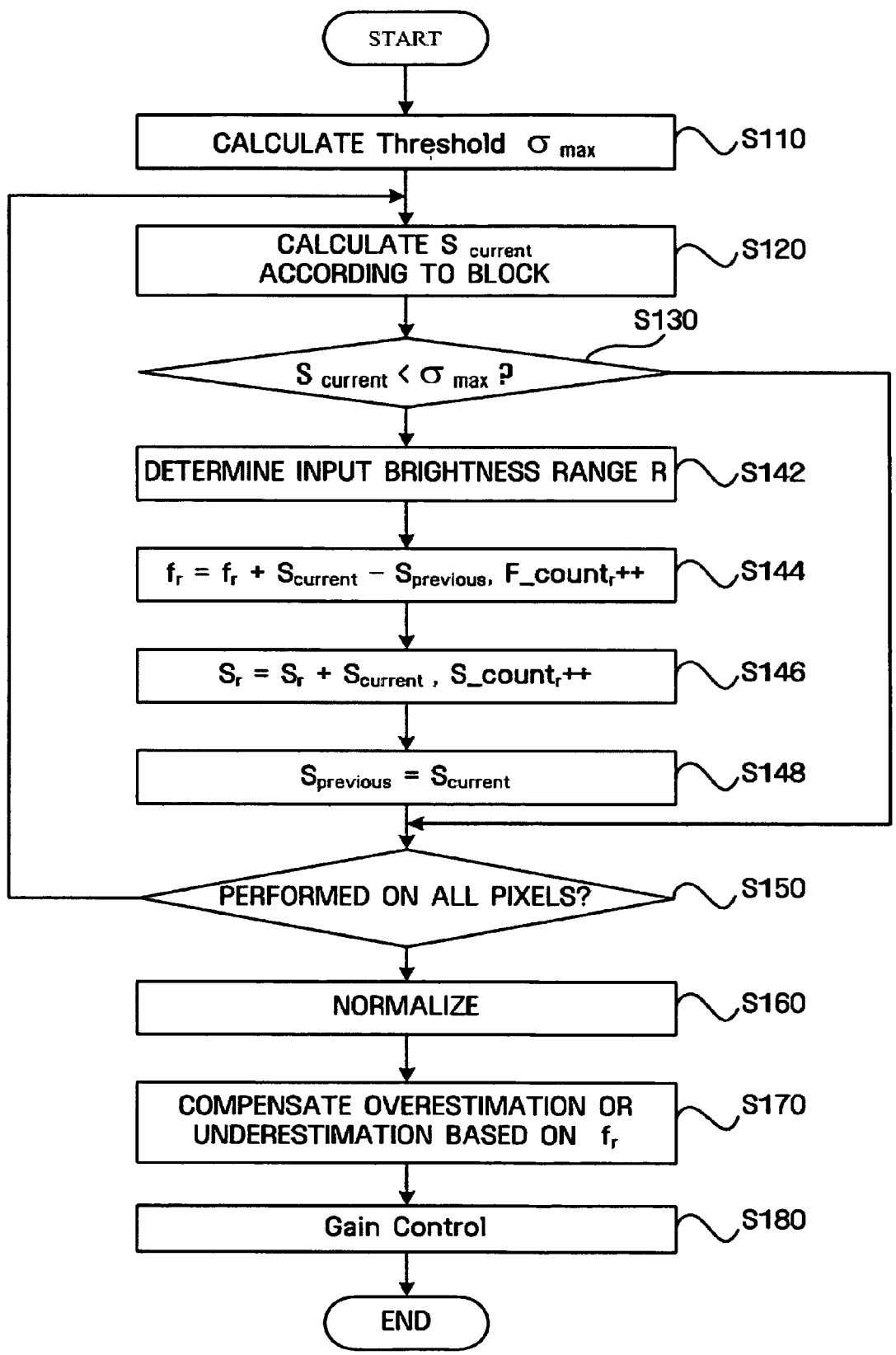
FIG. 2 is a flowchart illustrating a noise estimation process performed on an image signal according to an exemplary embodiment of the invention.

FIG. 2 is a flowchart illustrating in detail the noise estimation process performed on an image signal according to an exemplary embodiment of the invention shown in FIG. 1.

Figure 3:
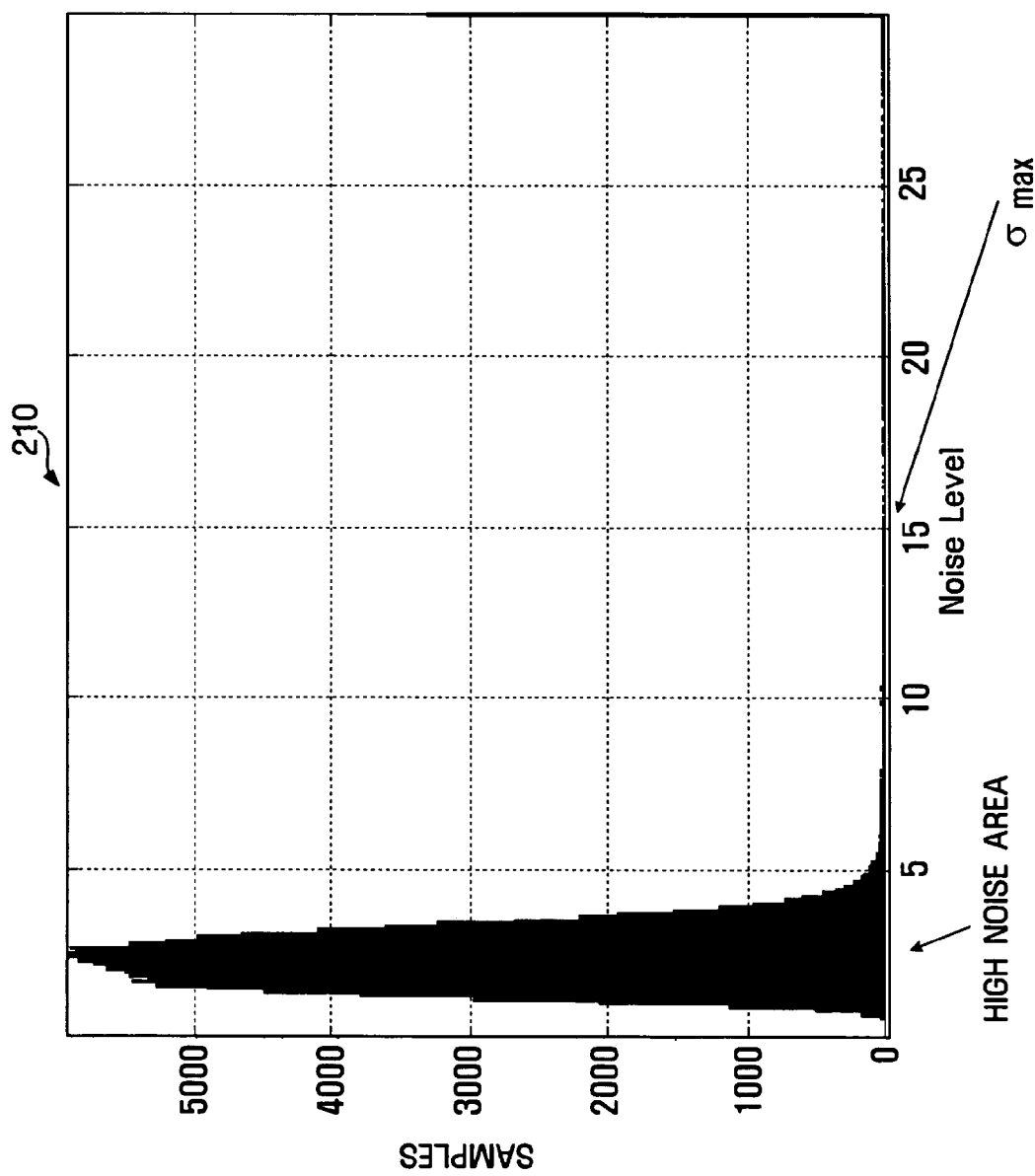
FIG. 3 is a graph illustrating a Gaussian noise distribution according to an exemplary embodiment of the invention.

A threshold value $\sigma_{max}$ for distinguishing noise from a texture is calculated at operation S110. The threshold value $\sigma_{max}$ may be a predefined value or a value set by a digital image device. For example, a threshold value or initial noise criterion may be set beforehand by auto-exposure. Examining an example where a Gaussian noise distribution model 210 is adopted as shown in FIG. 3, it is apparent that noise is concentrically distributed in a range from 0 to 5. Noise is less likely to occur in a tail area of the distribution model, but any noise in such an area is more likely to degrade quality. Accordingly, in this exemplary embodiment of the invention, the threshold value $\sigma_{max}$ is set to 15 so that a tail area of Gaussian distribution can be included.

When the initial noise criterion or threshold value $\sigma_{max}$ is calculated, a frame in an image is divided into blocks of a predetermined size and a statistic $S_{current}$ of the color characteristics of pixels composing each block is calculated in operation S120. Here, the statistic of the color characteristics indicates a value calculated by collecting all of the color characteristics of the pixels composing the block and performing statistical calculation thereon.

Such statistical calculating for producing the statistic of the color characteristics is exemplified as in Equation 1 below.

$$S_{current} = \frac{1}{N}\sum_{ij} \text{abs}(x_{ij} - \mu), \mu = \frac{1}{N}\sum_{ij} x_{ij} \qquad (1)$$

In Equation 1, in order to calculate color characteristics of a block, color characteristics $x_{ij}$ of individual pixels are collected, a mean value is calculated from the color characteristics $x_{ij}$, absolute values of differences are calculated from between the color characteristics $x_{ij}$ and the mean value. Then, the absolute values are averaged.

Sometimes, it is difficult to calculate a square or a square root according to the performance of a processor applied to the image sensor. Thus, the differences from the mean value are processed into the absolute values as in Equation 1 above, where N indicates the number of pixels in a window (or block).

In addition, color characteristics of a block can be calculated from differences between color characteristics of a center pixel value x and those $x_{ij}$ of individual pixels as in Equation 2 below.

$$S_{current} = \sum_{ij} \text{abs}(x - x_{ij}) \qquad (2)$$

In addition to Equations 1 and 2 above, $S_{current}$ can be calculated through Trimmed Sum of Absolute Difference (TSAD) for each block.

$S_{current}$ calculated in such a manner is compared with $\sigma_{max}$ at operation S130. If $S_{current}$ is smaller than $\sigma_{max}$, it can be determined as noise as seen in FIG. 3. Accordingly, a process of operation S142 and operation S148 are executed.

If $S_{current}$ is greater than $\sigma_{max}$, it can be determined as a texture as seen in FIG. 3, and operation S150 is executed accordingly.

Describing it in more detail, $S_{current}$ is compared with $\sigma_{max}$ to find blocks with $S_{current}$ smaller than $\sigma_{max}$, and an input brightness range r of color characteristics of such blocks is determined at operation S142. This is an example for determining the range of color characteristics for each block as seen in FIG. 1. Such a noise criterion may be estimated in a different way according to the color characteristics range of the block. For example, the range r can be selected as in Equation 3 below according to the range of center pixel information k of the block.

if 0<k≦50, then r=1 if 50<k≦100, then r=2 if 100<k≦150, then r=3 if 150<k≦200, then r=4 if 200<k≦250, then r=5 (3)

With the brightness range r indicating the class of an input range determined as above, differences according to texture-noise determination based on the range r are calculated. As the range r is determined, a process for re-determining whether the block is noise or a texture is performed.

For this, the difference between the statistic of the present block and that of a previous block is accumulated as in operation S144 of FIG. 2. A greater value of difference is more likely a texture than noise. Accordingly, statistical results of different blocks are compared with each other as in Equation 4 below.

$$f_r = f_r + S_{current} - S_{previous}, F\_count_r\text{++} \qquad (4)$$

According to r calculated from Equation 3 above, a difference between statistical values of a previous block and of the present one is accumulated with respect to a class r in which corresponding blocks can be included. With F_count$_r$++, it is possible to determine how many blocks are accumulated into the class r.

After the texture-noise difference is accumulated, as seen in Equation 5 in operation S146, a statistic $S_{current}$ of the present block is accumulated to a class to which the present block belongs. Then, S_count$_r$++ is executed to determine how many blocks are included in the class r.

$$S_r = S_r + S_{current}, S\_count_r\text{++} \qquad (5)$$

At operation S148, $S_{current}$ of the present block is stored in $S_{previous}$ to make it possible to determine whether a next block is a texture or noise. A process of operation S130 to operation S148 is executed to all blocks in operation S150.

When comparison with an initial noise criterion is completed for all blocks, normalization is executed in operation S160. Here, $f_r$ and $S_r$ accumulated in the aforementioned process of operation S144 and operation S146 are normalized. Such normalization is executed as in Equation 6 below.

$$f_r = \frac{f_r}{F\_count_r}, S_r = \frac{S_r}{S\_count_r} \qquad (6)$$

Since classes are sorted according to r and data are accumulated according to the classes in the aforementioned process, the normalization is executed.

Figure 4:
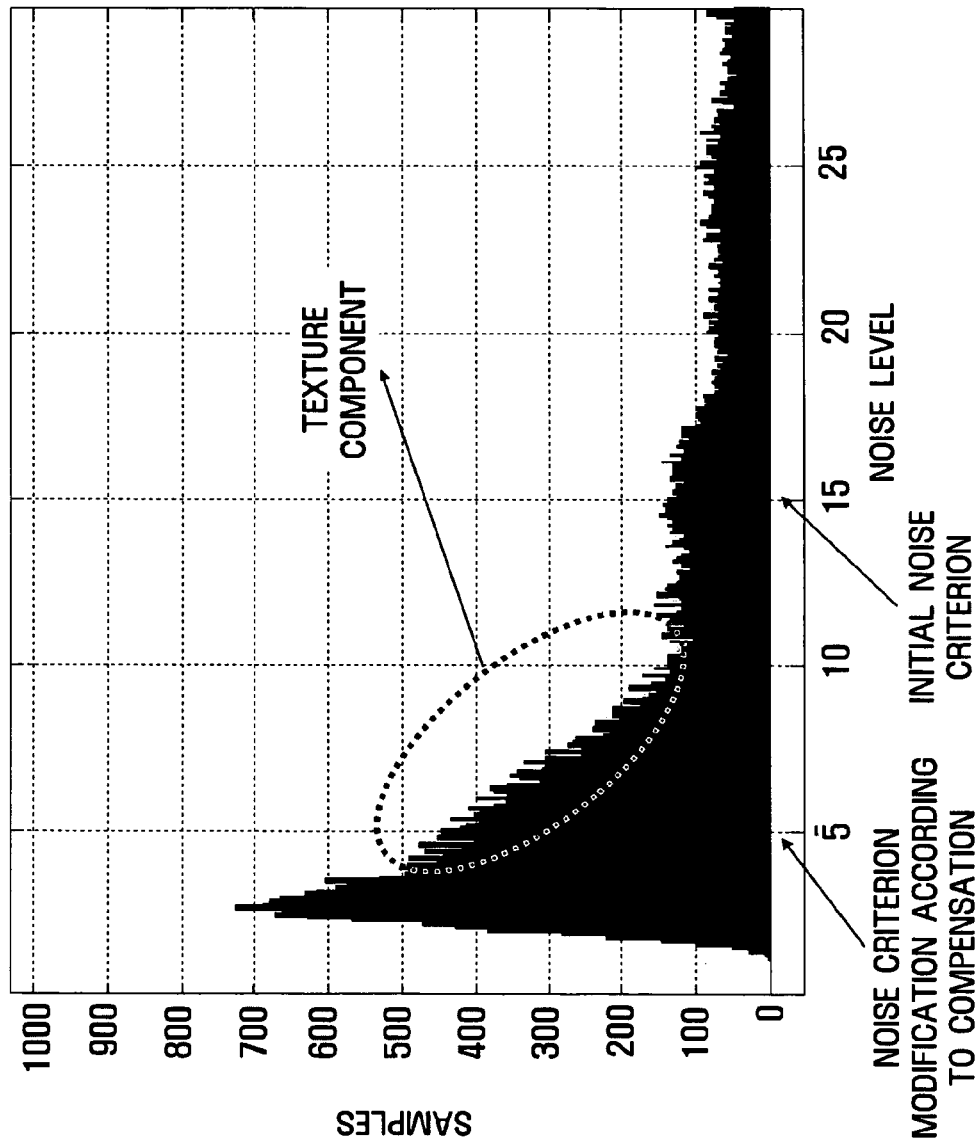
FIG. 4 is a graph illustrating a process of noise criterion modification in a case where texture information exists in a noise area according to an exemplary embodiment of the invention.

After the normalization, overestimation or underestimation is compensated based on a fluctuation feature $f_r$ in operation S170, which is shown in FIG. 4.

FIG. 4 is a graph illustrating a process of noise criterion modification in a case where texture information exists in a noise area according to an exemplary embodiment of the invention. The initial noise criterion is noise level 15 as shown in FIG. 3. However, it is observed that texture components are distributed even at 15 or less through the accumulation in FIG. 2. The texture components are not noise. Since the initial noise criterion is calculated based on noise that can potentially occur, it can be adjusted or modified. That is, since the initial noise criterion is overestimated, it can be compensated to noise level 5 with a texture area excluded therefrom.

In order to determine whether texture components are included in the noise level distribution, it is necessary to calculate a variance in a distribution map. However, such variance calculation needs to store all histogram data, thereby calculating a large amount of data. Accordingly, there is used the fluctuation feature $f_r$ in which the statistical differences between blocks are accumulated.

Figure 5:
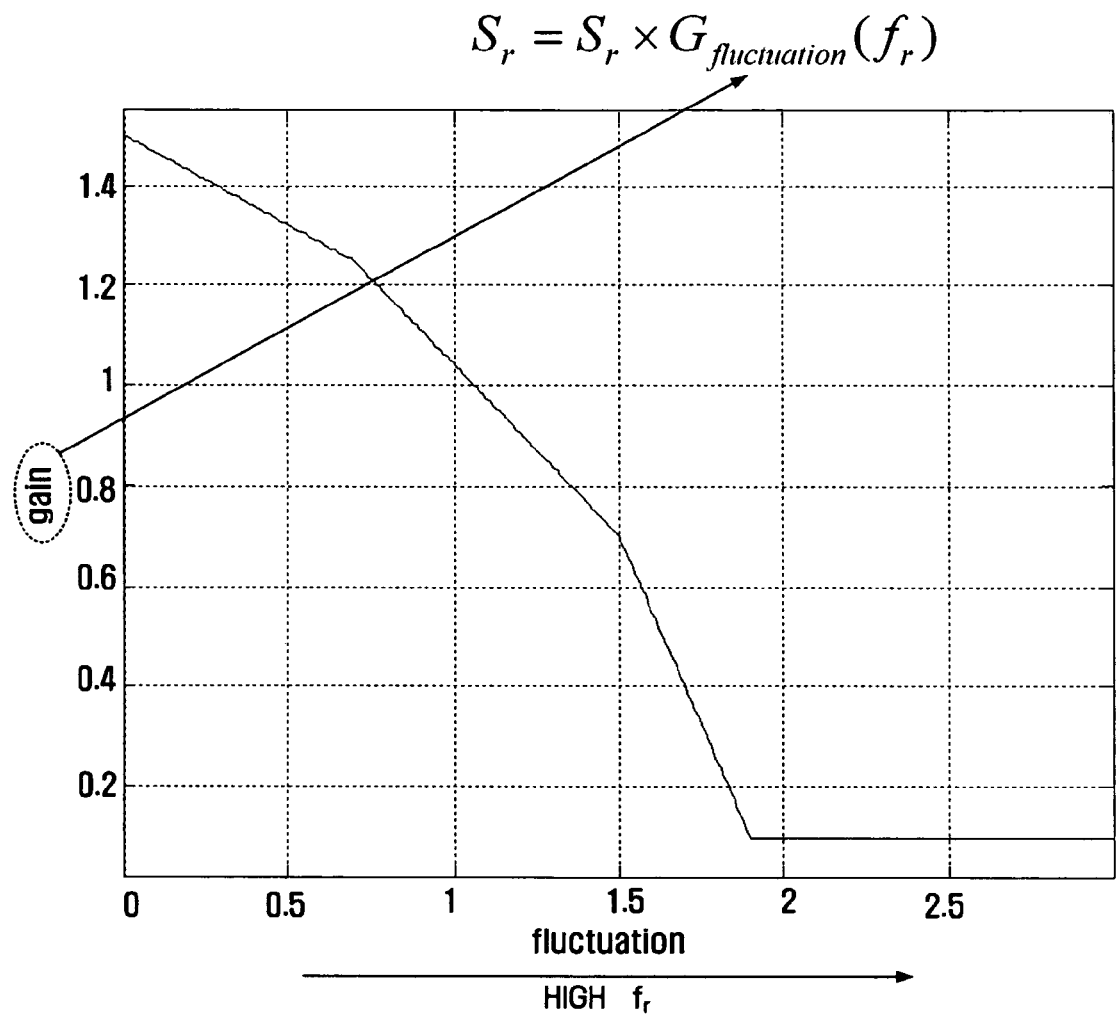
FIG. 5 is a graph illustrating an example of an image sensor noise level distribution according to an exemplary embodiment of the invention, in a specific brightness range with little influence of textures.

In order to compensate a noise criterion for overestimation or underestimation, the graph in FIG. 5 is used.

FIG. 5 is a graph illustrating an example of an image sensor noise level distribution according to an exemplary embodiment of the invention, in a specific brightness range with little influence of textures. In a noise level distribution where texture components are included, $f_r$ is high and thus compensation is performed with a low gain. In the meantime, if $f_r$ is low owing to pure Gaussian distribution, a higher gain is calculated in order to include most outliers of the tail.

A process of obtaining $G_{fluctuation}(f_r)$ is performed as in Equation 7 below in order to calculate the gain.

$$S_r = S_r \times G_{fluctuation}(f_r) \tag{7}$$

$G_{fluctuation}(f_r)$ in Equation 7 above can be empirically calculated with respect to an image sensor.

Finally, operation S180 in FIG. 2 is performed. This operation can be performed optionally. Even though overestimation or underestimation is compensated based on the fluctuation feature fr, a sensor module suffers from severe variation in noise characteristics according to a photographing environment. This makes it difficult to sufficiently remove overestimation or underestimation. Thus, gain control based on AGC and exposure time can be performed. For example, gain control as in Equation 8 below can be performed in a scene of an input image.

$$G_{scene} = AGC \times w1/100 + Exposure \times w2/100 + c \tag{8}$$

In Equation 8 above, Exposure is information on AGC and exposure time is variable in a range from 0 to 100%. Such values can be calculated from auto exposure of the image sensor.

Figure 6:
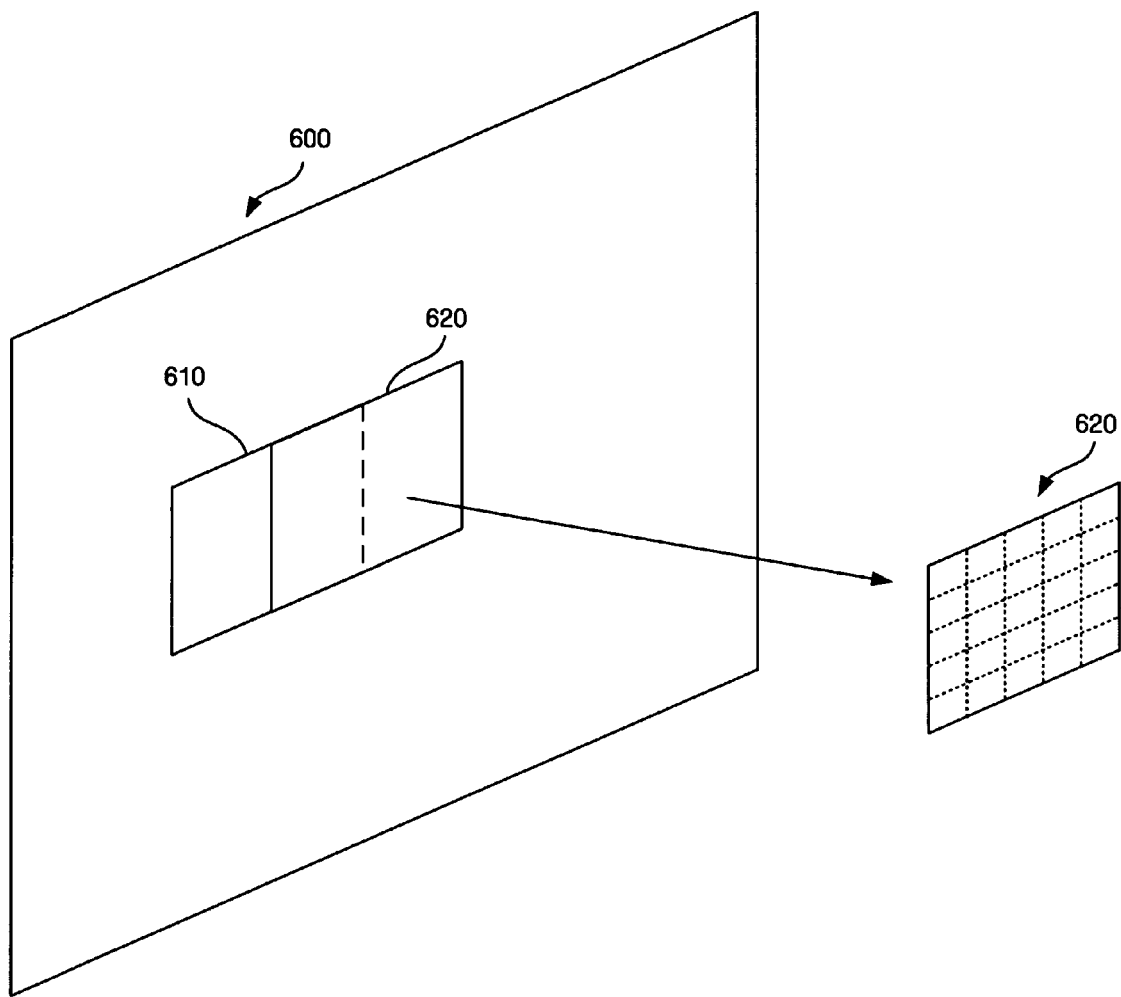
FIG. 6 is process diagram illustrating a process of calculating data from a block in an image according to an exemplary embodiment of the invention.

FIG. 6 is a process diagram illustrating a process of producing data from a block in an image according to an exemplary embodiment of the invention.

An image frame 600 inputted through an image sensor is composed of a number of blocks 610 and 620, in which each block of the frame may overlap adjacent ones in part as shown in FIG. 6. When blocks or windows overlap each other in part, a noise criterion can be calculated more correctly. The block 620 is composed of a plurality of pixels, and in this case, 5×5=25 pixels. The color characteristics of the block can be calculated from statistical values of color characteristics of the individual pixels.

Figure 7:
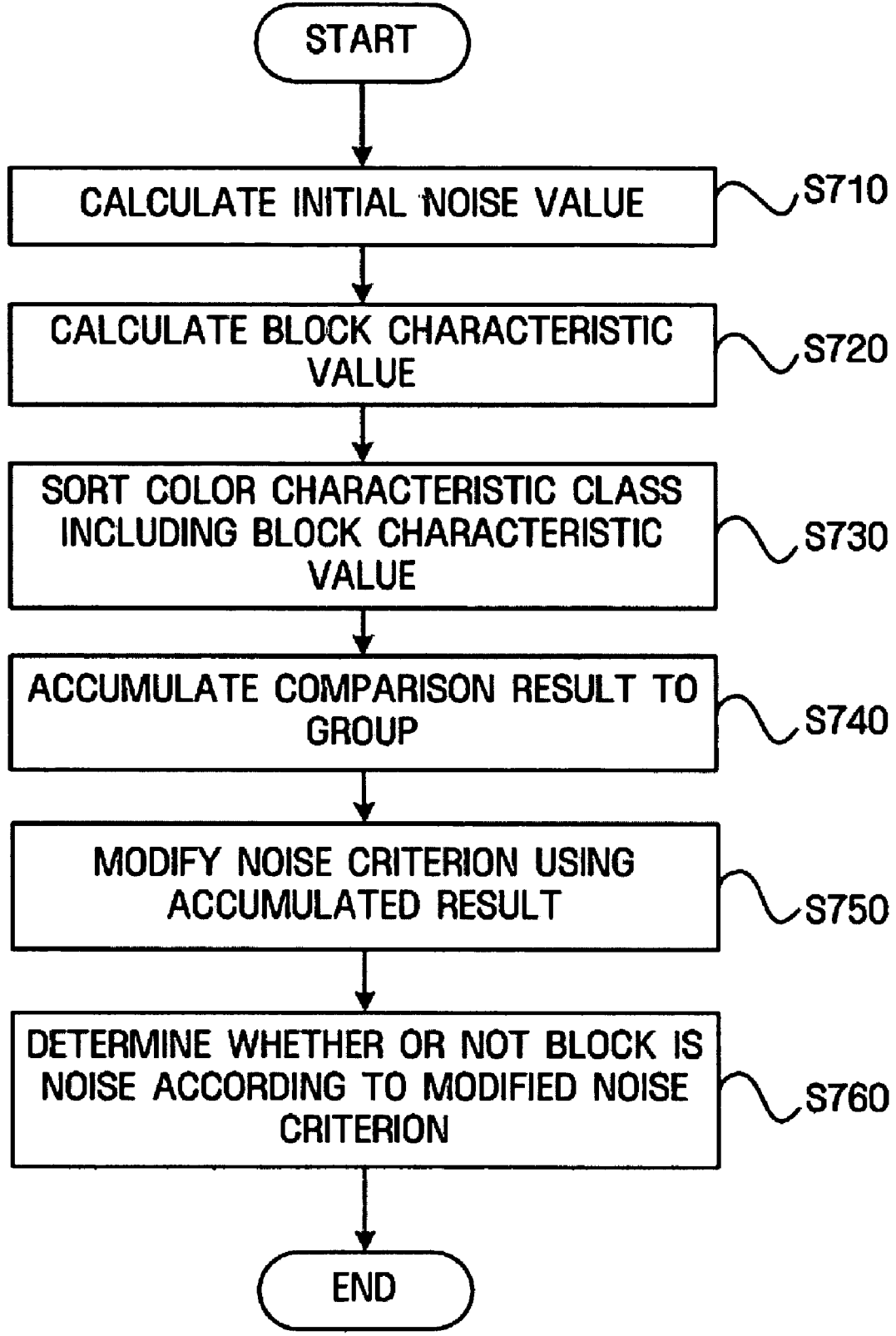
FIG. 7 is a flowchart illustrating a noise estimation process by an image sensor according to an exemplary embodiment of the invention.

FIG. 7 is a flowchart illustrating a noise estimation process by an image sensor according to an exemplary embodiment of the invention.

In operation S710, an initial noise criterion is calculated by extracting a value set to auto exposure (AE) of an image sensor or by using a result of previous noise estimation. In operation S720, characteristic values of blocks are calculated. Here, it is possible to raise data precision by overlapping the blocks onto each other in part. The block characteristic values are obtained from color values that colors of the pixels of each block have in a specific color space. The color space may be any of RGB, CMYK, YUV, YCbCr, YIQ, CIE, CIE L*a*b*, CIE LUV and so on. Then, operation S730 is executed to determine or group the color characteristic class of the block characteristic values. The color characteristic class may be exemplified by dividing the brightness range of input pixels according to a predetermined range.

In operation S740, the initial noise criterion is compared with the block characteristic values, which in turn are compared with previous block characteristic values, and then results of such comparison are accumulated to the group. With a result of such accumulation, the noise criterion can be normalized afterwards.

In operation S750, the noise criterion is modified using the accumulation result according to class group. When texture components are included in a noise area as shown in FIG. 4, the texture components excluded and the noise criterion is modified so that noise can be discerned. In operation S760, it is determined whether blocks in the image are noise according to the modified noise criterion. If the frame is composed of a number of blocks, a process of operation S720 to operation S740 can be repeated. After the noise criterion is modified, gain control can be executed. Such gain control can be executed based on an exposure time when the image is photographed.

Figure 8:
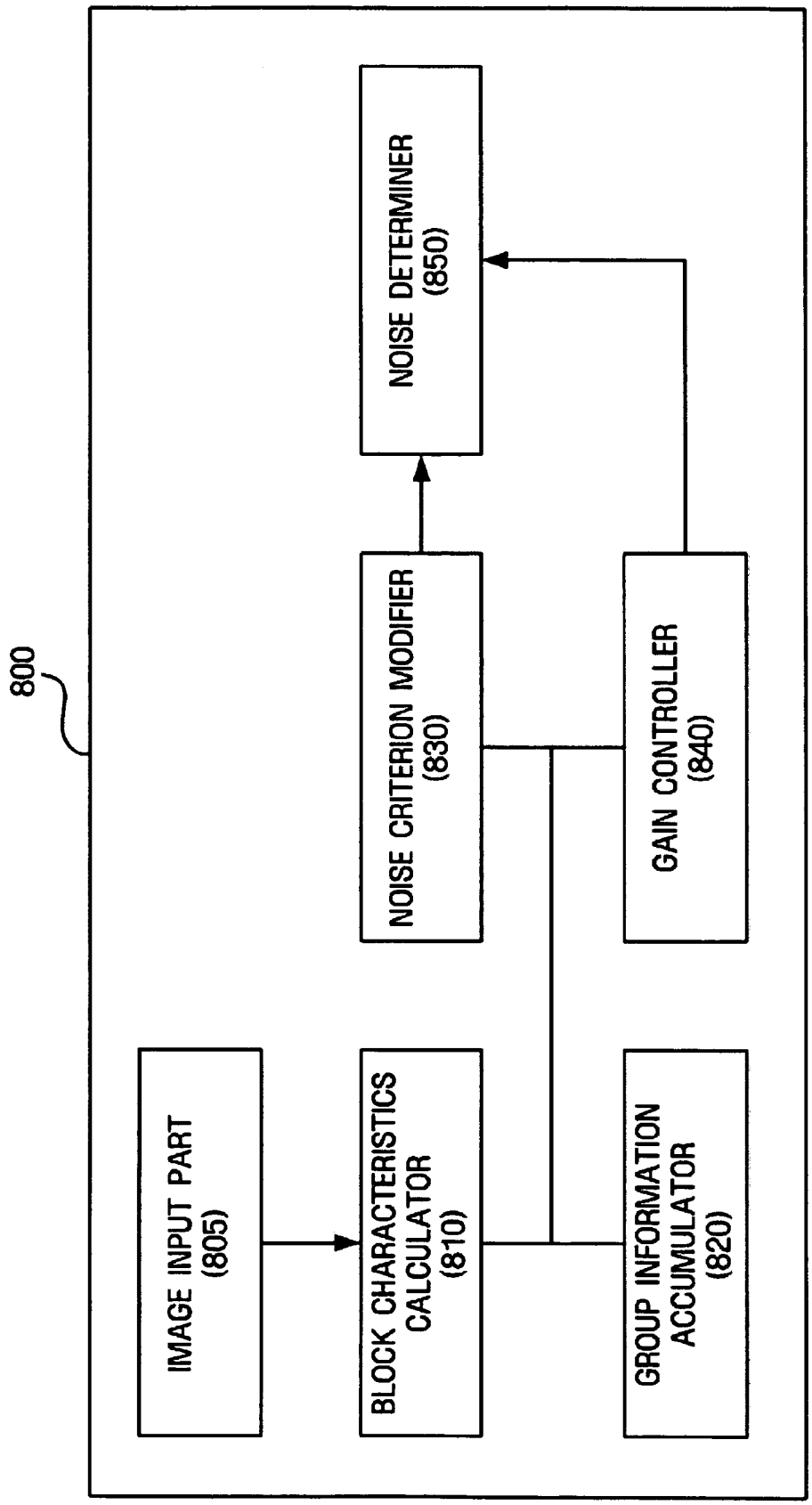
FIG. 8 is a block diagram illustrating components necessary for an image sensor to perform noise estimation according to an exemplary embodiment of the invention.

FIG. 8 is a block diagram illustrating components necessary for an image sensor to perform noise estimation according to an exemplary embodiment of the invention. The construction in FIG. 8 is applicable to various devices such as a digital camera and a digital camcorder which input an image through conversion into digital signals.

An image device 800 includes an image input part 805, a block characteristics calculator 810, a group information accumulator 820, a noise criterion modifier 830, a gain controller 840 and a noise determiner 850.

The image input part 805 receives an image from an image sensor. Since the input image includes noise, it is necessary to determine a criterion for the image input part 805 to discern noise.

The block characteristics calculator 810 calculates block characteristic value of a first one of blocks composing the input image, which can be compared with an initial noise criterion. Such block characteristic value is calculated from a color value that the color of a pixel of the block has in a specific color space. The color space may be one of RGB, CMYK, YUV, YCbCr, YIQ, CIE, CIE L*a*b*, CIE LUV and the like.

The group information accumulator 820 compares the block characteristic value of the first block with the initial noise criterion, determines the first group of a specific color characteristic class including the first block characteristic value, and accumulates a result of the comparison to the first group. According to the result accumulated by the group information accumulator 820, the noise criterion modifier 830 modifies the initial noise criterion and calculates a first group noise criterion to be applied to blocks belonging to the first group.

The noise criterion modifier 830 can calculate the initial noise criterion, in particular, by reading a preset value from the image sensor. Alternatively, the initial noise criterion can be extracted from value set in a previous frame or a previous input image.

The gain controller 840 performs gain control based on an exposure time when an input image is photographed. The noise determiner 850 examines a group of a color characteristic class to which block characteristic values of blocks of the input image belongs, and determines if such blocks are noise or a texture based on the noise criterion of such group. The color characteristic class may be exemplified by dividing the brightness range of input pixels according to a predetermined range.

The block characteristics calculator 810 can calculate block characteristic value for each block of the input image. Here, the block may be designed to overlap adjacent blocks in part, by which calculations can be performed more correctly than by collecting data from separated blocks.

With the block characteristic values calculated above, the noise criterion modifier 830 accumulates comparison results of the block characteristic values with the nose criterion according to the group.

Accordingly, the noise criterion modifier 830 can calculate the noise criterion differently according to the group. Here, by using results of accumulating the differences between the block characteristic values according to the group, normalization is performed to modify the initial noise criterion.

As described above, certain exemplary embodiments of the invention can efficiently restrict overestimation or underestimation to improve noise estimation performance in an image sensor.

A noise reducing system applied with this invention can improve original image preservation performance as well as noise removing performance. Furthermore, cost saving is also expected since such a system needs only a small memory capacity and a small amount of data.

Although exemplary embodiments of the present invention have been described for illustrative purposes, those skilled in the art will appreciate that various modifications, additions and substitutions are possible, without departing from the essential features and the scope and spirit of the invention as disclosed in the accompanying claims. Therefore, it should be appreciated that the exemplary embodiments described above are not limitative, but only illustrative.

What is claimed is:

1. A method for estimating noise determination criteria in an image sensor, the method comprising:
    calculating a color characteristic value for each of a plurality blocks of an input image;
    comparing a color characteristic value of a first block among the plurality of blocks with an initial noise criterion;
    sorting the color characteristic value of the first block as a first group of a color characteristic class and accumulating a result of the comparing into the first group; and
    modifying the initial noise criterion based on a result of the accumulating and calculating a first group noise criterion to be applied to corresponding blocks belonging to the sorted first group of the color characteristic class.

2. The method of claim 1, further comprising calculating the initial noise criterion for noise determination.

3. The method of claim 1, further comprising, after calculating the first group noise criterion, executing gain control based on an exposure time used when the image is photographed.

4. The method of claim 1, further comprising:
    comparing a color characteristic value of a second block of the plurality of blocks with the initial noise criterion; and
    determining a second group of the color characteristic class including the color characteristic value of the second block and accumulating a result of the comparing into the second group,
    wherein the calculating the first group noise criterion comprises:
    modifying the initial noise criterion using based on the result of the accumulating; and
    calculating a second group noise criterion to be applied to corresponding blocks belonging to the determined second group of the color characteristic class.

5. The method of claim 1, wherein the color characteristic class corresponds to one of classes defined by dividing brightness of an input pixel into brightness ranges.

6. The method of claim 4, wherein the first block overlaps a second block in an area.

7. The method of claim 1, wherein, in the calculating the first group noise criterion, the initial noise criterion is modified by executing normalization using a result of accumulating differences between the color characteristic values of the blocks belonging to the first group.

8. The method of claim 1, wherein the color characteristic value is calculated from a specific color value that a pixel constituting the block has in a given color space, and wherein the given color space is one of RGB, CMYK, YUV, YCbCr, YIQ, CIE, CIE L*a*b* and CIE LUV.

9. The method of claim 1, further comprising, after the calculating the first group noise criterion, discerning noise according to the first group noise criterion if the color characteristic values of the blocks in the input image are included in the first group of the color characteristic class.

10. An image device comprising:
    a block characteristics calculator which calculates a color characteristic value for each of a plurality of blocks of an input image;
    a sorted information accumulator which compares the color characteristic value of a first block among the plurality of blocks with an initial noise criterion, sorts the color characteristic value of the first block as a first group of a color characteristic class, and accumulates a result of the comparison into the first group; and
    a noise criterion modifier which modifies the initial noise criterion using the result of the accumulation and calculates a first group noise criterion to be applied to corresponding blocks belonging to the sorted first group of the color characteristic class.

11. The image device of claim 10, wherein the noise criterion modifier calculates the initial noise criterion for noise determination.

12. The image device of claim 10, further comprising a gain controller which executes gain control based on an exposure time used when the image is photographed.

13. The image device of claim 10, wherein the block characteristics calculator calculates a color characteristic value of a second block constituting the input image, wherein the sorted information accumulator compares the color characteristic value of the second block with the initial noise criterion, determines a second group of the color characteristic class including the color characteristic value of the second block, and accumulates a result of the comparison into the second group, and wherein the noise criterion modifier modifies the initial noise criterion using a result of the accumulation and calculates a second group noise criterion to be applied to corresponding blocks belonging to the sorted second group.

14. The image device of claim 10, wherein the color characteristic class corresponds to one of classes defined by dividing brightness of an input pixel into brightness ranges.

15. The image device of claim 10, wherein the first block overlaps the second block in an area.

16. The image device of claim 10, wherein the noise criterion modifier executes normalization using a result of accumulating differences between the color characteristic values of the blocks belonging to the first group.

17. The image device of claim 10, wherein the color characteristic value is calculated from a specific color value that a pixel constituting the block has in a given color space, and wherein the given color space is one of RGB, CMYK, YUV, YCbCr, YIQ, CIE, CIE L*a*b* and CIE LUV.

18. The image device of claim 10, further comprising a noise determining part which discerns noise according to the first group noise criterion if the color characteristic values of the blocks in the input image are included in the first group of the color characteristic class.

* * * * *